United States Patent Office 2,963,201
Patented Dec. 6, 1960

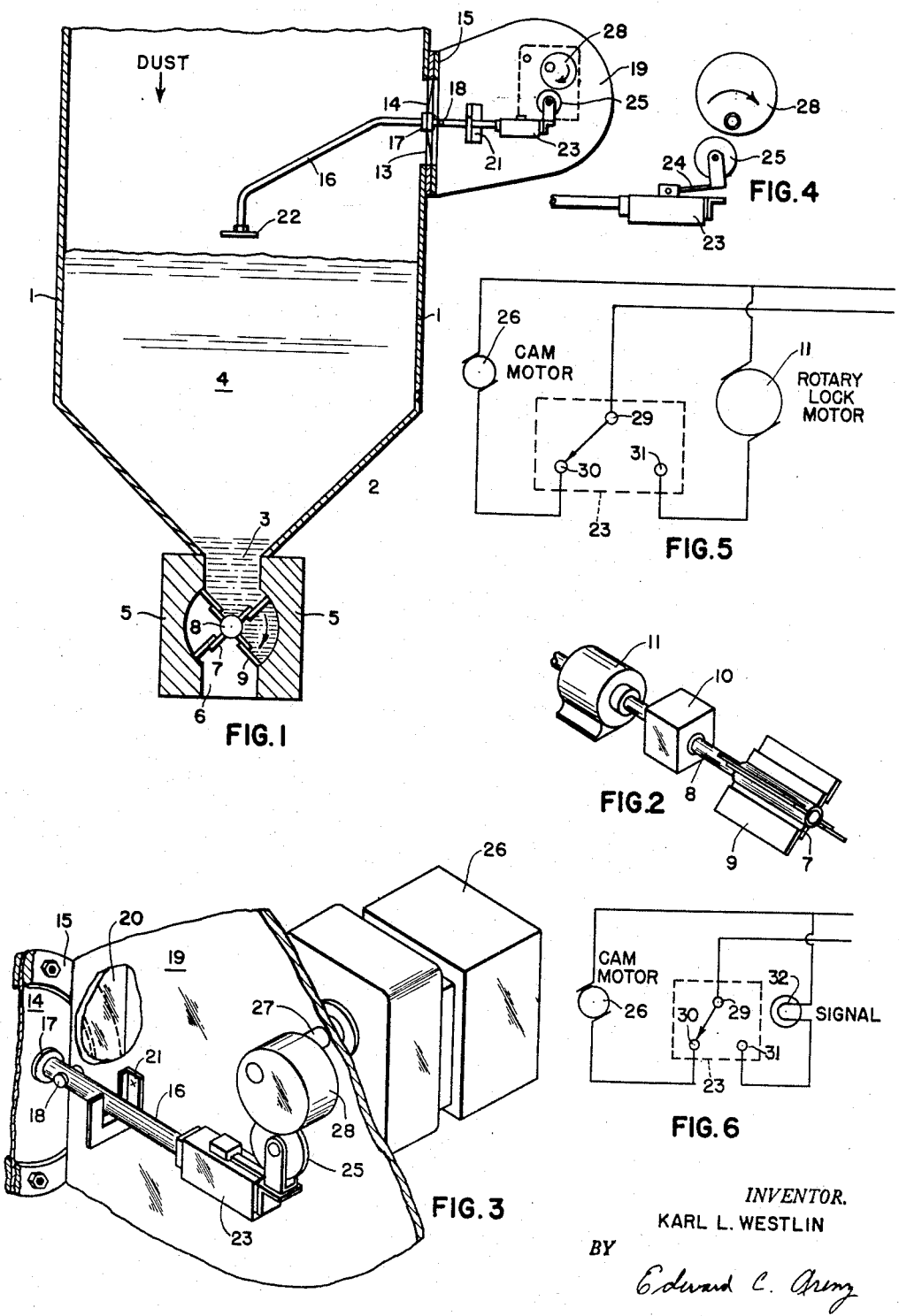

2,963,201
LEVEL INDICATING APPARATUS

Karl L. Westlin, Louisville, Ky., assignor to American Air Filter Company, Inc., Louisville, Ky., a corporation of Delaware Filed May 31, 1957, Ser. No. 662,910

2 Claims. (Cl. 222—63)

This invention relates to apparatus for sensing or detecting the build-up of material above a predetermined height in a container disposed to receive the material. The invention is particularly suited for use with a dust hopper for a dust separator or collector system.

Efficient operation of dust separator systems is promoted if the dust discharged into the hopper settles quickly and is relatively undisturbed after settling. While this is true in all systems, it is particularly important in those systems which include an arrangement for recirculating a fractional stream of gas from the hopper. If a turbulent condition in the hopper prevents the dust from effectively settling, the concentration of dust in the fractional stream will be increased.

In some separator systems, such as those where the dust is discharged into the hopper in a relatively high velocity air stream from the separator, the force of this air stream may create a turbulence which disturbs the accumulated dust. In such a case, it is desirable that the dust be prevented from building-up above a lower level in the hopper, thus minimizing the possibility of disturbance.

In certain other systems, such as those where the hopper is maintained under a suction pressure relative to atmospheric pressure, the accumulated dust may be disturbed by atmospheric air leaking through the dust gate on the hopper and upwardly through the dust. In this case, by maintaining the dust level in the hopper at or above a predetermined height, there is provided an equivalent head of dust which is equal to or greater than the pressure differential. In other words, the dust itself acts as a seal to prevent atmospheric air from leaking into the hopper. It is, of course, obvious that in such a system, the dust level should not be permitted to build-up any substantial distance above this critical height for the reasons heretofore stated.

It will thus be apparent that it is desirable that the level of accumulated dust in a hopper be maintained above a predetermined critical height in certain systems, and below a critical height in other systems to promote the most efficient operation of the particular system. As a prerequisite to controlling the accumulation of collected dust, it is necessary that it be known when the dust accumulation reaches the critical height.

It is therefore the object of the present invention to provide apparatus which will detect or sense the build-up of dust to a predetermined height in the hopper.

Another object is the provision of means for signalling when such a build-up is detected.

A further object is the provision of apparatus which will reduce the level when it builds up above this predetermined height.

A still further object is to provide apparatus which may be utilized to automatically carry out the foregoing operations.

I attain these objects by providing, in accordance with my invention, apparatus comprising: a member arranged to be reciprocated in a vertical direction within the hopper and disposed so that when the level of dust builds up to a critical height, the movement of the member will be stopped by the dust; motorized means for effecting this reciprocating movement of the member when the dust level is below the critical height; and means associated with the reciprocating member and operative, when said member is stopped in its reciprocating movement, to actuate a signal. As an additional feature of the present invention, I may provide motorized dust gate means operative to reduce the level of dust in the hopper when the movement of the reciprocating member is stopped by contacting the dust level.

The invention is illustrated in the accompanying drawing wherein:

Figure 1 is a vertical sectional view of a dust stopper provided with a rotary dust gate at its outlet, the dust level detecting apparatus being shown in elevation in a mounted position on the side wall of the hopper;

Figure 2 is a perspective view of the rotatable elements of the rotary dust gate connected to be driven by an electric motor;

Figure 3 is a partly broken fragmentary perspective view of the apparatus;

Figure 4 is a fragmentary enlarged elevational view of the motor driven cam and switch, this view illustrating the switch in a position which will energize, in one embodiment, the rotary dust gate motor so as to reduce the dust level in the hopper, or, in another embodiment, a level indicating signal;

Figure 5 is a wiring diagram illustrating the electrical connections between the switch, cam motor and rotary dust gate motor; and Figure 6 is a wiring diagram illustrating the electrical connections between the switch, cam motor and a signal.

Referring to the drawing, the upper or main portion of a conventional dust hopper is formed by vertical walls 1, with lower walls 2 extending downwardly therefrom in converging relationship to form the funnel-like lower edges. A dust separator (not shown) is conventionally arranged to deliver separated dust as indicated by the arrow in Figure 1 into the top of the hopper through a suitable inlet, this dust 4 then settling by gravity into the lower part of the hopper.

The outlet opening 3 is provided with any suitable dust gate for preventing the discharge of dust from the hopper except when such discharge is desired. A preferred form of dust gate is the rotary lock 5 which typically includes: a pair of side walls, also designated 5, having a portion of their inner faces concavely-shaped; a pair of end walls 6 which cooperate with the side walls 5 to form a box having an open top in communication with the outlet opening 3 and an open bottom through which dust may be discharged when the rotary lock is operated; and, a plurality of radial paddle plates 7 secured to and extending axially along a horizontally disposed shaft 8. As illustrated in this embodiment, the paddle plates preferably include flexible flaps 9 attached to the faces of the plates 7 so that the outer edges of these flaps will engage the concave portions of the side walls 5 in a sweeping manner as the plates are rotated. The shaft 8 extends through one end wall 6 to a suitable gear reducer box 10 (Figure 2) which is driven by electric motor 11. It will be seen that while the paddle plates 7 and flaps 9 thus effectively close the outlet opening 3 when the motor 11 is not energized, the rotary lock, when operated, will discharge somewhat controlled quantities of dust from the hopper. While other valve-like devices may be used, the character of the illustrated rotary lock is particularly suited for carrying out the invention in a preferred manner.

One of the vertical walls 1 is provided with a circular opening 13 spaced somewhat above the critical dust level in the hopper. This opening is closed by a sealing assembly mounted against the outside surface of the wall and over the opening, this assembly including a disc-like, flexible diaphragm 14 and a pair of annular rings 15 which are used to sandwich the marginal edges of the diaphragm therebetween. The rings are suitably fastened to the wall by bolts or the like as shown in Figure 3.

The center of the diaphragm is provided with a hole which accommodates the circumference of rod 16. To insure an air tight seal and to prevent tearing of the diaphragm where the rod passes therethrough, a pair of sealing washers 17 are arranged to abut the diaphragm on opposite faces thereof.

The rod 16 is pivotally supported, at a location closely adjacent the point where it passes through the diaphragm, by a horizontal pin 18 which passes diametrically through the rod and is fastened to a vertical mounting plate 19. The mounting plate extends outwardly from the opening 13 wtih the front face of the plate parallel to and spaced slightly rearwardly from that portion of rod 16 which also extends outwardly from the opening. The plate is provided with a rearwardly-directed flange 20 (Figure 3) which is secured to a portion of the outer annular ring 15 so that the plate 19 is firmly affixed to the wall.

It will be appreciated that by locating the pin 18 closely adjacent the hole in the diaphragm through which rod 16 passes, flexure of the diaphragm, due to movement of the rod, is minimized. It will also be noted that while the pin 18 will normally prevent undue lateral movement of the rod when it is moved in "see-saw" fashion about the pin, a guide bracket 21 having a vertical slot for accommodating the movement of the rod is preferably provided on the front face of the plate 19.

The inner end of rod 16 carries a dust detecting or probe member 22 which has a bottom face of sufficient area to prevent it from sinking any appreciable distance into the dust when it engages the surface thereof. This probe end of the rod is biased downwardly within the hopper by dimensioning and weighting the rod so that its moment in a counter-clockwise direction (as seen in Figure 1) is greater than its moment in a clockwise direction. This biasing may, of course, be accomplished by other suitable means such as a spring.

The rod 16 has mounted on its outer end an electric switch 23 which includes an operating element or arm 24 having one end pivotally secured to the body of the switch and the other end free for angular movement in a limited arc. This arm is biased upwardly, that is, away from the switch body, so that when the arm is unrestricted in its movement, it assumes the position shown in Figure 4. The free end of the arm 24 carries a rotatable follower wheel 25 having its axis disposed horizontally and normal to the plane of plate 19.

The plate 19 has a relatively slow speed (e.g. 4 r.p.m.) electric motor 26 mounted on its rear surface with the motor shaft 27 projecting through the plate and spaced vertically above, and parallel to, the axis of the follower wheel 25. A cam wheel 28 is eccentrically mounted on this shaft so that the circumferential face of the follower wheel 25 may ride against and follow the circumference of the cam wheel when the rod is free to move about the supporting pin 18. It will be apparent that, with the probe end of rod 16 biased downwardly, the switch end of the rod will be forced upwardly so that the follower wheel 25 will contact the circumference of the cam 28. Thus, when the cam is rotated about its eccentric axis, the follower wheel rides on the cam and a vertical reciprocating motion is imparted to the outer end of the rod 16, and the inner end of rod 16 moves in an opposite vertical reciprocating motion. While it has been explained that the force biasing the probe end of the rod 16 downwardly is not of a magnitude sufficient to cause the probe to sink into the dust an appreciable amount, the force is sufficient to maintain the operating arm 24 in a depressed position relative to the body of the switch 23.

The electrical connections for operating the apparatus in association with the motorized rotary lock 5 for automatically controlling the dust level will now be described. As shown in Figure 5, the switch 23 is a two position switch with a common terminal 29 and a pair of alternate terminals 30 and 31. When the operating arm 24 is held in a depressed position relative to the body of the switch, which occurs when the follower wheel 25 is riding against or is in contacting engagement with the cam wheel 28, the switch is maintained in its terminal 30 position and the cam motor 26 is operatively connected to the electrical power source. When the operating arm 24 is in its upwardly biased position, which occurs when the follower wheel 25 is not in contact with the cam wheel 28, the switch assumes its terminal 31 position and the motorized rotary lock is operatively connected to the power source. It will thus be apparent that when the cam motor 26 is energized, the rotary lock motor 11 is de-energized, and vice versa.

When it is desired to utilize the apparatus as a level detecting device only, the circuit shown in Figure 6 is used. In such a circuit, an indicating signal 32 is electrically connected in place of the rotary lock motor 11. Thus when the switch is in its terminal 30 position, the cam motor 26 is energized and the signal 32 de-energized. When the switch is in its terminal 31 position, the signal 32 is energized and the cam motor 26 is de-energized.

Operation

The operation of the apparatus for automatically maintaining the dust level at or slightly above a predetermined critical height in the hopper will first be described. This operation requires the use of a motorized dust gate such as the rotary lock 5, the circuit therefor being shown in Figure 5.

As the cam 28 is slowly rotated by its motor, a vertical reciprocating motion is imparted to the outer end of the rod 16. With the rod pivotally supported as previously described, the probe end of the rod is moved in an opposite vertical reciprocating motion. As long as the dust level in the hopper is below the lower point of travel of the probe end, the cam will continue to effect this movement of the rod. However, when the dust level in the hopper has built-up above the lowermost point of probe travel, the probe, in one of its downward movements, will engage the surface of the dust and be stopped. If the dust level is sufficiently above the lowermost point of probe travel that the circumference of the cam moves or draws out of contacting relationship with the follower wheel, the operating arm 24 will move to its biased or upper position, thereby transferring the switch 23 from its terminal 30 to its terminal 31 position. This transfer results in the cam motor being de-energized and the rotary lock motor being energized. As the dust is discharged from the hopper in somewhat metered amounts by the operation of the rotary lock, the dust level in the hopper falls and permits the probe to fall a corresponding distance. When the probe has dropped downwardly a distance sufficient to move the outer end of the rod upwardly so that the follower wheel again contacts the cam, the switch 23 is returned to its terminal 30 position, the cam motor again energized and the rotary lock motor de-energized.

If the dust level is not sufficiently above the lowermost point of probe travel to permit the cam to draw out of contacting relationship with the follower wheel, the switch 23 will remain in its terminal 30 position and the cam motor will continue to operate until, during some subsequent cycle, the dust level has built up an amount which, while slight, is sufficient to effect the separation of the cam and follower wheel circumferences.

It will thus be apparent that with the arrangement as described, the dust level will be maintained within a range having a lower limit slightly above the lowermost point of probe travel, and an upper limit below the uppermost point of probe travel, the upper limit being dependent upon the rate at which the probe is reciprocated and the rate at which the dust is discharged into the hopper. In passing, it may be noted that when the apparaus is to be used to maintain the level of dust between such limits for the purposes of preventing air from leaking into the hopper, the apparatus should be mounted so that the lowermost point of probe travel is slightly above the critical dust level.

The operation of the apparatus as a level detector only will now be described. In this case the circuit in Figure 6 is used and, as will be obvious, the dust level in the hopper will not be automatically reduced when transfer of the switch is effected by stopping the downward movement of the probe. Instead of energizing the motorized dust gate, the signal 32 will be actuated to indicate that the level is at or above the predetermined height. Thus the operator of the system will be alerted and he may then empty the hopper by opening whatever type dust gate is provided.

While the invention has been described with particular reference to its use with a dust separator system, it will be appreciated that it may be adapted for use in other operations wherein similar results are desired.

Having described my invention, I claim:

1. For a container disposed to receive material from a dust collector, level-indicating apparatus comprising: a material level sensing member pivotally mounted intermediate its ends for a nearly balanced see-saw motion to effect a reciprocating vertical movement of its inner end between a predetermined high position and a predetermined low position in said container, the inner end of said member being biased downwardly toward said low position; electric motor means carrying a rotatable cam wheel disposed adjacent the outer end of said sensing member to effect said reciprocating movement of said sensing member when the material level in said container is not above said low position; and, electric switch means fixed to the outer end of said sensing member in a position adapted to be contacted by the circumference of said cam wheel, said switch means being operative, when movement of said sensing member is restricted by the inner end thereof engaging a material level above said low position, to energize a signal and de-energize said electric motor means.

2. For a container disposed to receive material from a dust collector, level-controlling apparatus comprising: a material level sensing member including a rod projecting through a wall of said container and pivotally supported at a point intermediate its ends for a nearly balanced see-saw motion to effect a reciprocating vertical movement of the inner end of said rod between a predetermined high and low position in said container, said inner end being biased downwardly; motorized means including a rotatable cam wheel mounted adjacent the outer end of said rod and operative, when the material level in said container is at or below said position, to impart said reciprocating movement; dust gate means at the bottom of said container to reduce the material level when energized; switch means carried by the outer end of said rod in a position adapted to be engaged by the circumference of said cam wheel, said switch means being electrically connected to energize said motorized means and de-energize said dust gate means when engaged by said cam wheel, and to de-energize said motorized means and energize said dust gate means when the rotation of said cam wheel results in the disengagement of said cam wheel from said switch means.

References Cited in the file of this patent

UNITED STATES PATENTS

| | | |
|---|---|---|
| 2,408,221 | Michel | Sept. 24, 1946 |
| 2,471,778 | Ringer | May 31, 1949 |
| 2,475,404 | Reed | July 5, 1949 |
| 2,638,248 | Alvord | May 12, 1953 |
| 2,672,871 | Slovic | Mar. 23, 1954 |
| 2,680,298 | Obenshain | June 8, 1954 |
| 2,714,472 | Richardson | Aug. 2, 1955 |
| 2,754,995 | Switzer | July 17, 1956 |